UNITED STATES PATENT OFFICE.

EDWARD A. WHITCOMB, OF CINCINNATI, OHIO.

WELDING-FLUX.

SPECIFICATION forming part of Letters Patent No. 277,393, dated May 8, 1883.

Application filed February 16, 1883. (No specimens.)

*To all whom it may concern:*

Be it known that I, EDWARD A. WHITCOMB, a citizen of the United States, and a resident of Cincinnati, in the county of Hamilton and State of Ohio, have invented certain new and useful Improvements in Welding-Flux, of which the following is a specification.

My invention relates to a new flux adapted to clean and promote the uniting of metals by welding, brazing, or soldering.

One object of my invention is to provide a compound or flux which will, as a reagent, cause a ready welding or brazing of the hardest steel; also to provide a substance which will produce a much stronger union of pieces of metal when used to prepare them for welding or brazing.

The following is the preferred formula for preparing my compound: Take fluor-spar one hundred parts, by weight, finely pulverized, and four pounds of soda-alum freed from its water of crystallization, finely pulverized, and mix the two powders thoroughly. Fluor-spar usually contains silica, which is essential in my compound. An excess of silica does no harm, and I prefer to add ten parts of silica, finely powdered, to the compound. So, also, soda-alum of commerce usually contains impurities, and to neutralize such impurities and prevent the generation of deleterious gases I add two parts of pulverized borax; but if the fluor-spar contains ten per cent. of silica, and the alum be chemically pure and the water of crystallization be driven off, the compound is adapted to be used in the usual manner, by placing it on the parts to be brazed or welded in the manner usually employed with other substances now used for like purposes.

I have found my compound to be superior to any other fluor acids or salts hitherto used in brazing or welding metal.

The proportions here stated are believed to be the best; but they can be varied to a considerable degree without seriously impairing its efficiency. Other alums could be used but they are inferior to soda-alum.

I claim—

1. As a new article of manufacture, a flux composed of fluor-spar and alum mechanically mixed, substantially as herein set forth.

2. Flux composed of fluor-spar, silica, and alum mechanically mixed, substantially as herein set forth.

3. A flux composed of fluor-spar, silica, alum, and borax, mechanically mixed, substantially as herein set forth.

In testimony whereof I have hereunto set my hand in the presence of two subscribing witnesses.

EDWARD A. WHITCOMB.

Witnesses:
JNO. E. JONES,
A. GLUCHOWSKY.